United States Patent
Hwang et al.

(10) Patent No.: US 9,356,878 B2
(45) Date of Patent: May 31, 2016

(54) METHOD FOR AVOIDING NETWORK CONGESTION AND AN APPARATUS THEREOF

(75) Inventors: Jae Hyun Hwang, Seoul (KR); Joon Yoo, Seongnam-Si (KR)

(73) Assignee: Alcatel Lucent, Boulogne-Billancourt (FR)

( * ) Notice: Subject to any disclaimer, the term of this patent is extended or adjusted under 35 U.S.C. 154(b) by 168 days.

(21) Appl. No.: 14/237,935

(22) PCT Filed: Sep. 6, 2011

(86) PCT No.: PCT/KR2011/006566
§ 371 (c)(1),
(2), (4) Date: Feb. 10, 2014

(87) PCT Pub. No.: WO2013/035897
PCT Pub. Date: Mar. 14, 2013

(65) Prior Publication Data
US 2014/0185453 A1    Jul. 3, 2014

(51) Int. Cl.
*H04L 1/00* (2006.01)
*H04L 12/807* (2013.01)
*H04L 12/26* (2006.01)
*H04L 12/801* (2013.01)
*H04L 12/841* (2013.01)
(Continued)

(52) U.S. Cl.
CPC ............ *H04L 47/27* (2013.01); *H04L 43/0864* (2013.01); *H04L 47/12* (2013.01); *H04L 47/193* (2013.01); *H04L 47/28* (2013.01); *H05B 3/12* (2013.01); *H05B 3/56* (2013.01); *H01C 7/008* (2013.01); *H04L 1/1832* (2013.01)

(58) Field of Classification Search
USPC ......... 370/235, 236, 229, 231, 410, 389, 412, 370/392; 709/232, 233, 234, 235
See application file for complete search history.

(56) References Cited

U.S. PATENT DOCUMENTS

| | | |
|---|---|---|
| 5,193,151 A | 3/1993 | Jain |
| 7,013,346 B1 | 3/2006 | Tucker |

(Continued)

FOREIGN PATENT DOCUMENTS

| | | |
|---|---|---|
| EP | 1052797 A2 | 11/2000 |
| JP | 2005286530 A | 10/2005 |

(Continued)

OTHER PUBLICATIONS

Jiao Zhang et al., "Modeling and Understanding TCP incast in Data Center Networks," INFOCOM, 2011 Proceedings IEEE, IEEE, XP031953312, Apr. 10, 2011, pp. 1377-1385.

(Continued)

*Primary Examiner* — Chi H Pham
*Assistant Examiner* — Alexander O Boakye
(74) *Attorney, Agent, or Firm* — Harness, Dickey & Pierce, P.L.C.

(57) ABSTRACT

A method for avoiding a network congestion at a network includes an aggregator and a plurality of workers, wherein the plurality of workers share the same bottleneck link to the aggregator. The method includes counting a number of connections between the aggregator and the worker, and adjusting a window size of each of the workers. The window size is based on the number of connections. The method further includes adding an ACK delay to an ACK, and sending the ACK with the window size to the worker. The ACK delay is based on the window size.

20 Claims, 8 Drawing Sheets

(51) Int. Cl.
  *H05B 3/12* (2006.01)
  *H05B 3/56* (2006.01)
  *H04L 1/18* (2006.01)
  *H01C 7/00* (2006.01)

(56) References Cited

U.S. PATENT DOCUMENTS

| | | |
|---|---|---|
| 7,600,037 B2 | 10/2009 | Tucker |
| 8,004,989 B2 | 8/2011 | Shimonishi |
| 2006/0155870 A1 | 7/2006 | Tucker |
| 2009/0073975 A1 | 3/2009 | Shimonishi |
| 2010/0054123 A1 | 3/2010 | Yong |
| 2011/0211449 A1* | 9/2011 | Attar .................. H04L 47/10 370/235 |

FOREIGN PATENT DOCUMENTS

| | | |
|---|---|---|
| JP | 2009077036 A | 4/2009 |
| JP | 2009284529 A | 12/2009 |
| WO | WO-2007043373 A1 | 4/2007 |

OTHER PUBLICATIONS

International Search Report PCT/ISA/210 for PCT/KR2011/006566 dated Apr. 26, 2012.
Written Opinion PCT/ISA/237 for PCT/KR2011/006566 dated Apr. 26, 2012.
Y. Zhang et al., "On Mitigating TCP Incast in Data Center Networks"; IEEE Infocom; Apr. 1, 2011.

* cited by examiner

Figure 2

| Rate-Based Incast-Avoidance Algorithm. |
|---|
| 1: Parameters: |
| 2:    *tcp_num*: Total number of TCP connections for the interface |
| 3:    *link_capacity*: Link rate of the interface |
| 4:    $T$: Time interval between data packets |
| 5:    $ACK\_delay$: Time interval between ACK packets |
| 6:    *advertise*: Advertisement window size |
| 7:    *rtt_min*: Minimum round trip time |
| 8: |
| 9: Initialization for global variables: |
| 10:    $tcp\_num \leftarrow 0$ |
| 11: |
| 12: On creating a TCP connection: |
| 13:    $tcp\_num \leftarrow tcp\_num + 1$ |
| 14: |
| 15: On closing a TCP connection: |
| 16:    $tcp\_num \leftarrow tcp\_num - 1$ |
| 17: |
| 18:    $trigger \leftarrow false$ |
| 19: Sending an ACK: |
| 20:    $T = tcp\_num / link\_capacity / MSS$ |
| 21:    $advertise = \max(\text{int}(rtt\_min/T), 1)$ |
| 22: |
| 23: if $trigger == false$ then |
| 24:    $ACK\_delay = \text{random::uniform}(0, rtt\_min + Delta)$ |
| 25:    $trigger \leftarrow true$ |
| 26: else |
| 27:    $ACK\_delay = (T * advertise) - rtt\_min$ |
| 28: end if |
| 29: |
| 30: if $ACK\_delay > 0$ then |
| 31:    delay.timer($ACK\_delay$) |
| 32: else |
| 33:    send the ACK with *advertise* immediately |
| 34: end if |

METHOD FOR AVOIDING NETWORK CONGESTION AND AN APPARATUS THEREOF

CROSS-REFERENCE TO RELATED APPLICATIONS

This application is a national phase under 35 U.S.C. §371 of PCT International Application No. PCT/KR2011/006566 which has an International filing date of Sep. 6, 2011; the entire contents of which are hereby incorporated by reference.

TECHNICAL FIELD

In recent years, the data center applications and web search generally shows the Partition/Aggregate communication pattern. First, a request is partitioned and sent to a number of worker nodes. And then, the response packets generated by the workers are transmitted to a common node for aggregation, i.e., aggregator node. Such type of traffic may cause network congestion, as multiple workers send the response packets to the same aggregator at the same time. The design of the transport protocols for data center networks have been challenging due to this incast congestion problem.

BACKGROUND ART

A. Related Work

The TCP incast problem was reported first by D. Nagle et al. in the design of a scalable storage architecture. They found that the concurrent traffic between a client and many storage devices overwhelms the network as the number of storage devices increases. This results in multiple packet losses and timeout, forcing the client to be idle for a long RTO duration. To mitigate the incast congestion, they reduce the client's receive socket buffer size to under 64 kB. They also suggest to tune at the TCP level such as reducing the duplicate ACK threshold and disabling the slow-start to avoid retransmission timeout. However, they do not address the fundamental incast problem.

Two main approaches that address the incast problem have been proposed. The first approach reduces the $RTO_{min}$ from a millisecond to a microsecond granularity. This solution is very effective for cluster-based storage systems where the main performance metric is to enhance TCP throughput. Nonetheless, it is not adequate for soft real-time applications such as web search because it still induces high queuing delay. The second approach is to employ congestion avoidance before the buffer overflows. RTT is usually a good congestion indicator in a wide area network, so that a delay based congestion avoidance algorithm such that TCP Vegas may be a good candidate. However, it is well known that the microsecond granularity of RTT in data centers may be too sensitive to distinguish the network congestion from the delay spikes caused by the packet/forwarding processing overhead. Therefore, DCTCP uses the Explicit Congestion Notification (ECN) to explicitly detect network congestion, and provides fine-grained congestion window based control by using the number of ECN marks. Another approach is ICTCP. ICTCP measures the bandwidth of the total incoming traffic to obtain the available bandwidth, and then controls the receive window of each connection based on this information. The incast congestion, however, is inevitable as the number of workers increases in these approaches.

B. Limitation of Window-Based Congestion Control

FIG. 1 depicts a typical topology where the incast congestion occurs. To avoid such incast congestion, the total number of outstanding packets should not exceed the network pipe size, which is obtained from the Bandwidth Delay Product (BDP).

This is expressed as:

[Math Figure 1]

$$BDP = \text{Link capacity} \times RTT \geq \Sigma_{i=1}^{n} w_i \times MSS \quad (1)$$

where, MSS denotes the Maximum Segment Size, n is the total number of concurrent connections, and $w_i$ is the window size of the ith connection. In this case, the BDP could be extremely small in data center networks. For example, if a network path has 1 Gbps of link capacity and 100 us of delay, then the BDP is approximately 12.5 kB or 8.3MSS when the MSS is 1.5 kB. This implies that $\Sigma_{i=1}^{n} w_i$ should be less than 8.3 to avoid pipe overflow. In this case, the number of TCP connections that the path can sustain will be 8 at most if the minimal window size is one. In other words, more than 9 TCP connections may cause queuing delay and packet loss if all senders transmit at least one packet simultaneously. For this reason, the existing window-based control schemes basically are not scalable in the typical data center network applications that utilize a number of workers. This insight leads to a rate-based control approach based on the BDP measurements for data center environments.

DISCLOSURE

Technical Problem

There are several reasons that TCP does not work well under the prior incast communication pattern. First, the Top of Rack (ToR) switches typically use small buffer memories (e.g. 4 MB of shared memory for 52 ports) to reduce cost, and this leads to frequent buffer overflows, i.e., packet losses. Second, even a few packet losses may result in TCP timeouts because the number of response packets in a flow is usually too small for fast retransmission and recovery to occur. Furthermore, in commodity operating systems, the minimum Retransmission TimeOut ($RTO_{min}$) is generally set to either 200 ms or 300 ms, while the Round Trip Times (RTT) in data center networks can be less than 250 us. In this case, it would take more than 800 RTTs to detect the packet loss. Lastly, in the Partition/Aggregate pattern, the aggregator may need to wait for all responses from its workers to make a meaningful result, so that the overall performance is determined by a single congested connection even though most of the connections do not experience any packet losses. In summary, the Partition/Aggregate traffic pattern usually causes network congestion in data center networks, and this results in TCP throughput collapse, degrading the quality of service (QoS) of web applications.

Technical Solution

The present invention employs an end-to-end congestion avoidance algorithm to address the incast problem. In specific, The present invention proposes the Incast-Avoidance TCP (IA-TCP), a rate-based congestion control algorithm that limits the total number of packets injected into the network pipe to meet the bandwidth-delay-product (BDP). An algorithm of the present invention is designed to operate at the aggregator side by means of TCP acknowledgement (ACK) regulation, to control the TCP data sending rate of the workers. Through NS-2 simulations, the present invention shows that IA-TCP completely avoids the incast congestion and shows high goodput and fast query completion time.

The TCP incast congestion problem has been previously studied in many literatures of the prior art. These prior arts mainly focus on the window-based congestion control, while the present invention proposes a rate-based congestion control algorithm.

According to an aspect of the present invention, there is provided a method for avoiding a network congestion at a network including an aggregator and a plurality of workers, wherein the plurality of workers share the same bottleneck link to the aggregator, the method comprising: counting a number of connections between the aggregator and the worker; adjusting a window size (W) of each of the workers, wherein the window size (W) is based on the number of connections; adding an ACK delay (Δ) to an ACK, wherein the ACK delay (Δ) is based on the window size (W); and sending the ACK with the window size (W) to the worker.

According to a preferred embodiment, the counting the number of connections further comprises initializing the number of connections.

According to another preferred embodiment of the method, the number of connections is increased whenever the connection is created, and the number of connections is decreased whenever the connection is closed.

According to another preferred embodiment of the method, the counting the number of connections further comprises sending a query request to each of the workers.

According to another preferred embodiment of the method, the window sizes (W) of all connections are the same.

According to another preferred embodiment of the method, the adjusting the window size (W) further comprises setting the window size (W) to a maximal value.

According to another preferred embodiment of the method, the maximal value of the window size is $$\text{advertise} = \max\left(\left\lfloor\frac{\text{Link capacity}/MSS \times RTT}{n}\right\rfloor, 1\right),$$

where, advertise is the window size, MSS is a maximum segment size, RTT is a minimum round trip time, and n is a total number of concurrent connections.

According to another preferred embodiment of the method, the ACK delay (Δ) is $$\Delta = \left(\frac{n}{\text{Link capacity}/MSS} \times \text{advertise}\right) - RTT,$$

where, advertise is the window size, MSS is a maximum segment size, RTT is a minimum round trip time, and n is a total number of concurrent connections.

According to another preferred embodiment of the method, instead of a first one of the ACK delay (Δ), a random value from 0 to (RTT+Δ) that follows uniform distribution is chosen, where, RTT is a minimum round trip time.

According to another preferred embodiment of the method, the sending the ACK with the window size (W) is executed after a delay timer expires, if the ACK delay (Δ) is larger than zero.

According to another preferred embodiment of the method, the sending the ACK with the window size (W) is immediately executed without a delay, if the ACK delay (Δ) is negative.

According to another preferred embodiment of the method, the method is executed in a TCP layer.

According to another preferred embodiment of the method, the method is a rate-based congestion control algorithm.

According to another aspect of the present invention, there is provided an aggregator for avoiding a network congestion at a network including the aggregator and a plurality of workers, wherein the plurality of workers share the same bottleneck link to the aggregator, and wherein the aggregator comprises a processor (not shown) and a transceiver (not shown), the processor is configured to perform: counting a number of connections between the aggregator and the worker; adjusting a window size (W) of each of the workers, wherein the window size (W) is based on the number of connections; and adding an ACK delay (Δ) to an ACK, wherein the ACK delay (Δ) is based on the window size (W), and the transceiver is configured to perform sending the ACK with the window size (W) to the worker.

According to a preferred embodiment of the aggregator, the counting the number of connections further comprises initializing the number of connections.

According to another preferred embodiment of the aggregator, the number of connections is increased whenever the connection is created, and the number of connections is decreased whenever the connection is closed.

According to another preferred embodiment of the aggregator, the counting the number of connections further comprises sending a query request to each of the workers through the transceiver.

According to another preferred embodiment of the aggregator, the window sizes (W) of all connections are the same.

According to another preferred embodiment of the aggregator, the adjusting the window size (W) further comprises setting the window size (W) to a maximal value.

According to another preferred embodiment of the aggregator, the maximal value of the window size is $$\text{advertise} = \max\left(\left\lfloor\frac{\text{Link capacity}/MSS \times RTT}{n}\right\rfloor, 1\right),$$

where, advertise is the window size, MSS is a maximum segment size, RTT is a minimum round trip time, and n is a total number of concurrent connections.

According to another preferred embodiment of the aggregator, the ACK delay (Δ) is $$\Delta = \left(\frac{n}{\text{Link capacity}/MSS} \times \text{advertise}\right) - RTT,$$

where, advertise is the window size, MSS is a maximum segment size, RTT is a minimum round trip time, and n is a total number of concurrent connections.

According to another preferred embodiment of the aggregator, instead of a first one of the ACK delay (Δ), a random value from 0 to (RTT+Δ) that follows uniform distribution is chosen, where, RTT is a minimum round trip time.

According to another preferred embodiment of the aggregator, the sending the ACK with the window size (W) is executed after a delay timer expires, if the ACK delay (Δ) is larger than zero.

According to another preferred embodiment of the aggregator, the sending the ACK with the window size (W) is immediately executed without a delay, if the ACK delay (Δ) is negative.

According to another aspect of the present invention, there is provided network system comprises the aggregator and the plurality of workers, wherein the workers share the same bottleneck link to the aggregator, wherein the aggregator comprises a processor and a transceiver, wherein the processor is configured to perform: counting a number of connections between the aggregator and the worker; adjusting a window size (W) of each of the workers, wherein the window size (W) is based on the number of connections; and adding an ACK delay (Δ) to an ACK, wherein the ACK delay (Δ) is based on the window size (W), wherein the transceiver is configured to perform sending the ACK with the window size (W) to the worker, and wherein the aggregator follows the above embodiments for the aggregator.

According to another aspect of the present invention, there is provided a computer program for avoiding a network congestion at a network including an aggregator and a plurality of workers, wherein the plurality of workers share the same bottleneck link to the aggregator, the computer program executes counting a number of connections between the aggregator and the worker; adjusting a window size (W) of each of the workers, wherein the window size (W) is based on the number of connections; adding an ACK delay (Δ) to an ACK, wherein the ACK delay (Δ) is based on the window size (W); and sending the ACK with the window size (W) to the worker, and wherein the computer program follows the above embodiments for the method.

Advantageous Effects

The value of the present invention is that the well-known incast congestion in data center networks can be perfectly avoided. The main benefit therefore would be that the data center applications such as cloud services, web search, etc., will eventually show better performance, i.e. quality of service (QoS).

DESCRIPTION OF DRAWINGS

FIG. 2 illustrates an Incast-Avoidance algorithm performed at the aggregator for avoiding a network congestion.

MODE FOR INVENTION

Figure 1:
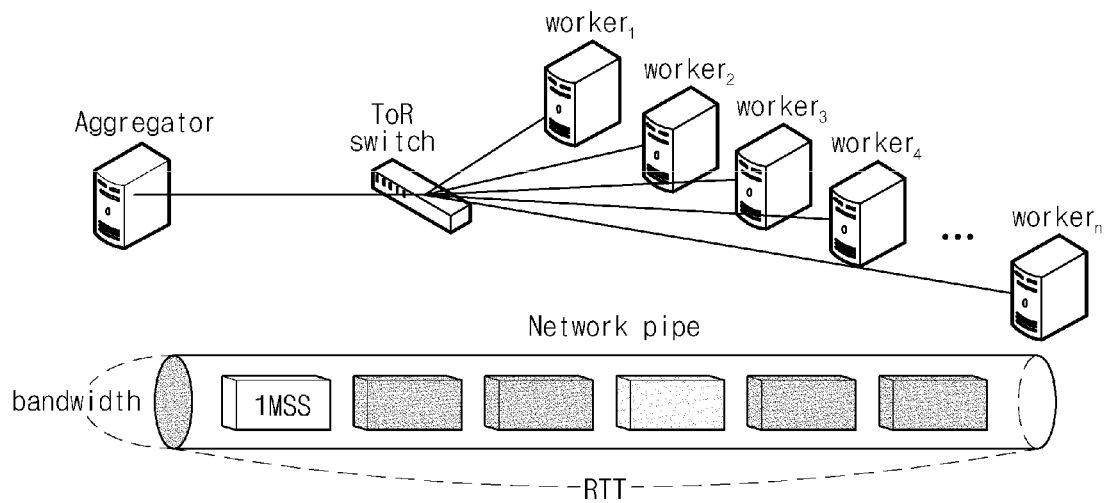
FIG. 1 illustrates a structure of a typical network topology for Partition/Aggregate application.

In this section, an ideal data packet rate for the incast-avoidance is derived, and then the IA-TCP algorithm of the present invention is explained in detail.

A. Data Packet Rate for Incast-Avoidance

The incast-avoidance means that total number of outstanding packets does not exceed the BDP of the path so that the Partition/Aggregate application does not cause any network congestion at all. To this end, it is necessary to control the aggregate data packet rate of the workers, $\sum_{i=1}^{n} w_i \times MSS/RTT$, to be less than the link capacity from Eq. (1). The approach of the present invention is to add Δ(s) to the RTT in case the total number of data packets increases. For instance, suppose that link capacity is 10MSS/RTT. This means that only 10 packets are allowed to be in the path during one round trip time in order to avoid network congestion. At this moment, the present invention can allow 20MSS by adding a delay of 1RTT to the denominator to achieve the same rate, 20MSS/2RTT. Now, the aggregate data packet rate for the incast-avoidance, IA Rate, is defined as follows.

[Math FIG. 2]

$$IA\ Rate = \frac{\sum_{i=1}^{n} w_i \times MSS}{RTT + \Delta} \leq \text{Link capacity} \quad (2)$$

As a result, the present invention can actively avoid the incast congestion that occurs at a ToR switch if all workers send data packets at the IA Rate.

FIG. 2 presents an Incast-Avoidance algorithm according to the present invention. The Incast-Avoidance algorithm is performed at the aggregator for avoiding a network congestion at a network including an aggregator and a plurality of workers. In brief, the line numbers 9-16 are to count the total number of TCP connections (i.e. workers) that share the same bottleneck link. Whenever the aggregator needs to send an ACK, it calculates advertise to control the total number of packets injected by workers, in the lines 19-21. And then, ACK_delay (Δ) would be made, but uniform random delay for the first ACK, in the 23-28. In the lines 20, the link capacity means the link rate of the interface connected to the ToR switch, and it is assumed that it is obtainable information at TCP layer. Finally, if the ACK_delay is larger than zero, the ACK with advertise would be sent after the delay timer expires, in the lines 30-34. This also implies that the algorithm of the present invention does not use delayed ACK, but immediate ACK.

The detailed IA-TCP algorithm is follows. The aggregator counts the number of TCP connections between the aggregator and the workers (lines 9-16). A global variable is initialized as tcp_num←0 (lines 9-10). And, the global variable is increased, whenever a connection is created (lines 12-13). Likewise, the global variable is decreased, whenever a connection is closed (lines 15-16). In these cases, query requests are usually sent to each worker from the aggregator. For this reason, the present invention performs acknowledgement (ACK) packet control rather than data packet control.

And then, the window size of each worker ($w_i$) and the ACK interval (Δ) are adjusted at the aggregator to make the aggregate data packet rate less than the link capacity.

Firstly, the window size of each worker ($w_i$) is adjusted (lines 19-21). Whenever the aggregator needs to send ACK (line 19), the window size ($w_i$) is calculated to control the total number of packets injected by workers (lines 20-21). In this case, the window sizes of all connections are assumed to be the same as W for the simplicity and the fairness between IA-TCP connections. Then, the window sizes W from Eq. (1) as follows.

Figure 3:
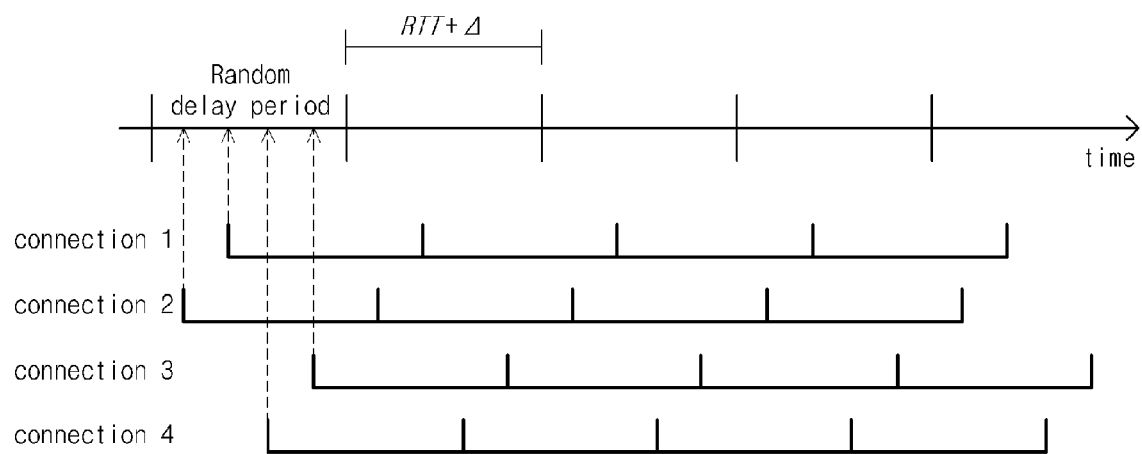
FIG. 3 illustrates an example of random delay for the first ACK period.

[Math FIG. 3]

$$W \leq \frac{\text{Link capacity}/MSS \times RTT}{n} \quad (3)$$

Since workers that employ standard TCP basically have no ability for the incast avoidance, the present invention uses this W to control the window size of each connection using the advertisement field in the ACK header. For example, if the BDP is 10MSS and n is 5, then the advertisement window would be 2 so that each worker is allowed to send two data packets per RTT. And, then the advertisement window to the maximal value of W may be set as follows (line 21). Also, it is noted that the window size should be an integer value and its minimal value is one.

Figure 4:
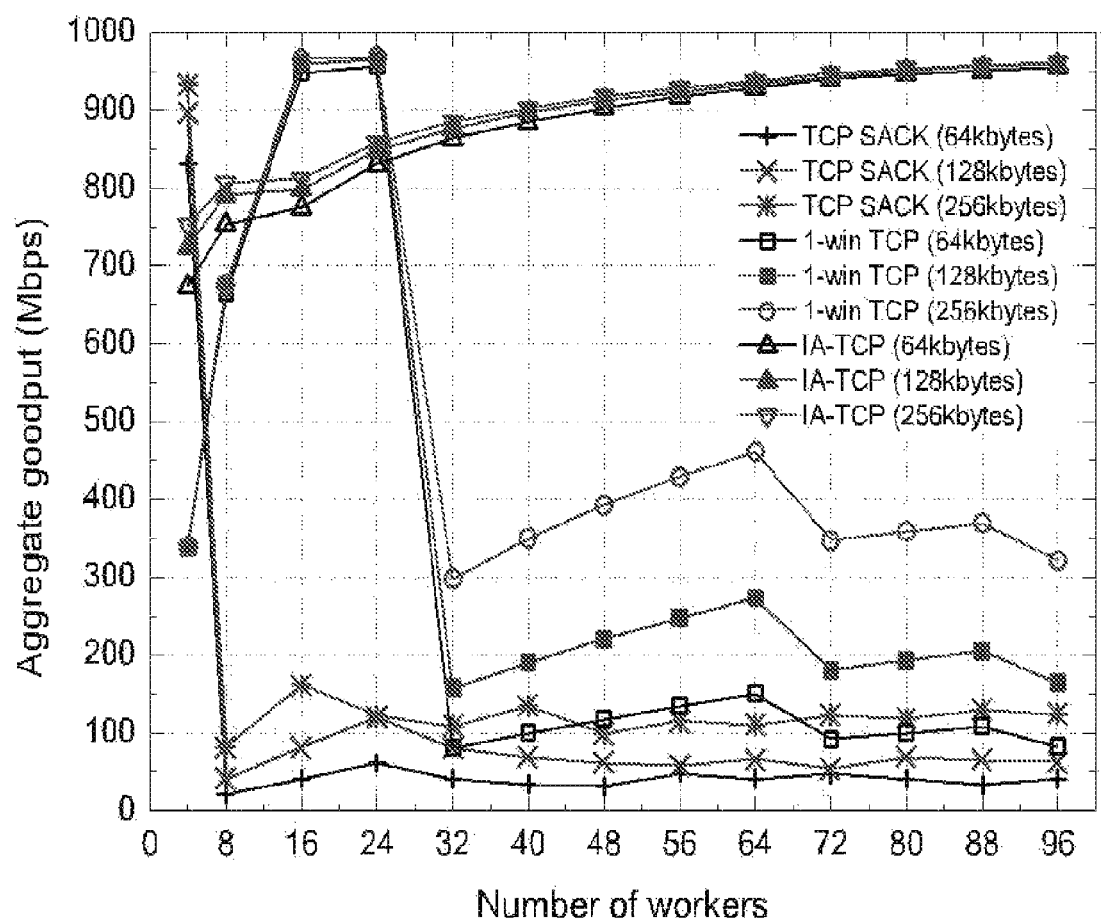
FIG. 4 illustrates an aggregate goodtput (Mbps) with no background flow.

[Math FIG. 4]

$$\text{advertise} = \max\left(\left\lfloor \frac{\text{Link capacity}/MSS \times RTT}{n} \right\rfloor, 1\right) \quad (4)$$

Secondly, ACK_delay ($\Delta$) is adjusted, but uniform random delay for the first ACK (lines 23-28). Adding the ACK_delay ($\Delta$) to each ACK packet is executed at the aggregator side. This delay prevents the aggregate data packet rate from exceeding the link capacity when the W is less than 1, but the advertisement window becomes 1 by Eq. (4). From (2), (3), and (4), it follows that

Figure 5:
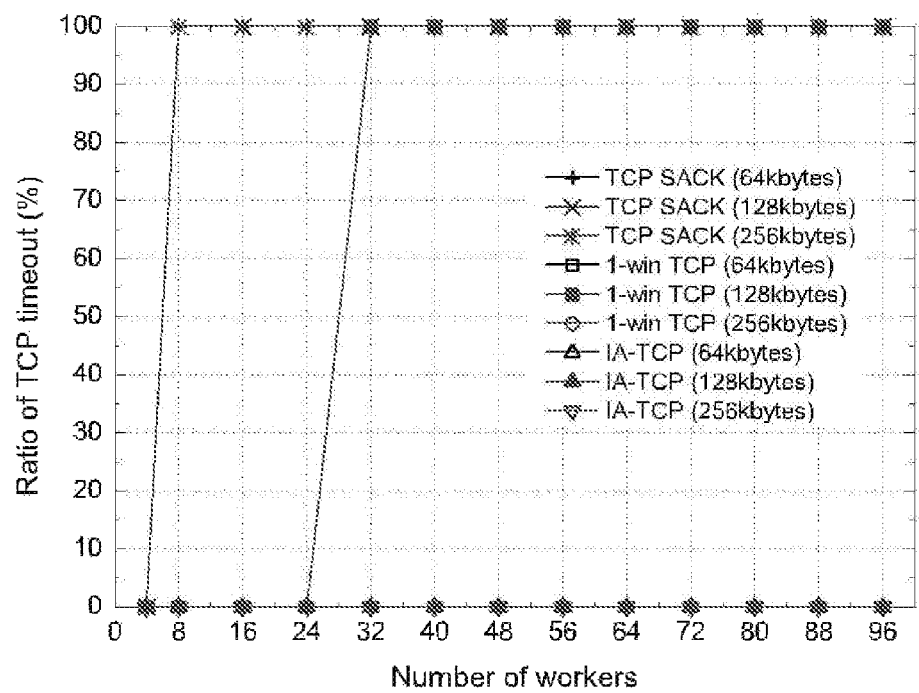
FIG. 5 illustrates a ratio of TCP timeout (%) with no background flow.

[Math FIG. 5]

$$\Delta = \left(\frac{n}{\text{Link capacity}/MSS} \times \text{advertise}\right) - RTT \quad (5)$$

And then, if the ACK_delay is larger than zero, the ACK with advertise would be sent after the delay timer expires (lines 30-34). If the $\Delta$ is negative, the ACK can be sent immediately without a delay (lines 30, 32-34). Lastly, even though total number of outstanding packets is controlled by the aggregator, it might be possible to overflow if the sending times of all workers are unusually synchronized. To prevent such transmission synchronization, a random value from 0 to (RTT+$\Delta$) that follows uniform distribution for the first ACK_delay is chosen, instead of $\Delta$. FIG. 3 shows an example that random delay is given for each connection during the random delay period (i.e. the first ACK), so that all outstanding packets are timely distributed over the path with n/(RTT+$\Delta$) of mean interval from the next period.

Simulation Results

Now, the IA-TCP algorithm is implemented by NS-2. one aggregator and multiple workers are connected to the same ToR switch, whose buffer size (per port) is 56 packets (assuming 4 MB of shared memory/52 ports/1.5 kB of MSS). Link capacity is set to 1 Gbps, and round trip propagation delay between workers and aggregator is set to 100 us. In all experiments, the aggregator sends 10 B of request query to workers, and then each worker replies a specific size of data to the aggregator. The packet size is fixed at 1500 bytes and $RTO_{min}$ is set to 200 ms.

Because of code unavailability of existing congestion avoidance schemes (e.g. ICTCP), the IA-TCP algorithm is compared to TCP SACK and 1-win TCP, whose sending window size is fixed to one, thereby the limitation of window-based congestion control schemes in terms of scalability can be confirmed.

A. Aggregate Goodput and Ratio of Timeout with No Background Traffic

The most important performance metric for evaluating the proposed scheme would be to show how much the incast congestion is mitigated. an aggregate goodput and ratio of timeout by setting the response data size to 64 kB, 128 kB, and 256 kB is measured. The aggregate goodput means the total amount of received data from workers over the time from sending the query request to receiving the last data packet among multiple workers. The results are averaged by 100 iterations. The ratio of timeout means the number of simulations that experience at least one timeout over the total number of iteration (i.e. 100). The number of workers up to 96 may be increased since there can be about 100 concurrent connections to an aggregator for 90th percentile in a real data center. There is no background traffic here.

FIG. 4 presents a graph of the aggregate goodput and it is observed that 1-win TCP shows performance degradation as the number of workers is more than 32 even though it shows the highest goodput in a certain range. This result reveals the limitation on the window-based congestion control in data center networks. That is, the minimum window size (1-window) can cause the incast congestion as the number of workers increases. On the other hand, the goodput of IATCP is achieving high aggregate goodput. This shows that the proposed scheme controls the data packet rate of all connections well so that the workers can share the small network pipe with high scalability.

FIG. 5 presents a graph of the ratio of TCP timeout. The graph illustrates TCP SACK and 1-win TCP experience 100% of ratio of timeout when the number of workers is more than 8 and 24, respectively, but IA-TCP shows zero timeout in all experiments. Furthermore, when considering that the existing window-based incast avoidance approaches, i.e., DCTCP and ICTCP, cause at least one timeout (with more than 35 workers in their experiment setup), the IA-TCP algorithm of the present invention is more scalable in terms of the number of workers.

B. Aggregate Goodput with a Long-Term Background TCP Flow

Figure 6:
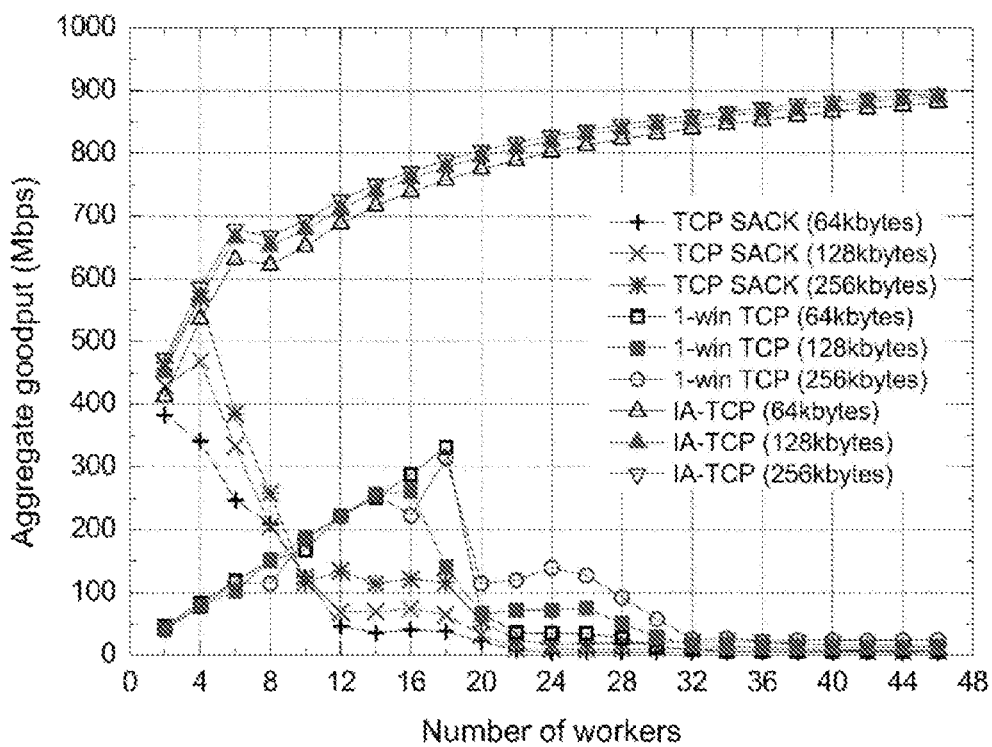
FIG. 6 illustrates an aggregate goodput (Mbps) with a long-term TCP flow.

FIG. 6 shows the aggregate goodput of the Partition/Aggregate flows. It is observed that both 1-win TCP and TCP SACK are highly degraded due to the background TCP flow, but the goodput of IA-TCP is getting higher as the number of workers increases. The difference in the size of response data seems to rarely affect the goodput of IA-TCP. This simulation shows no timeout for IA-TCP as well, but this is skipped here.

C. Query Completion Time

Figure 7:
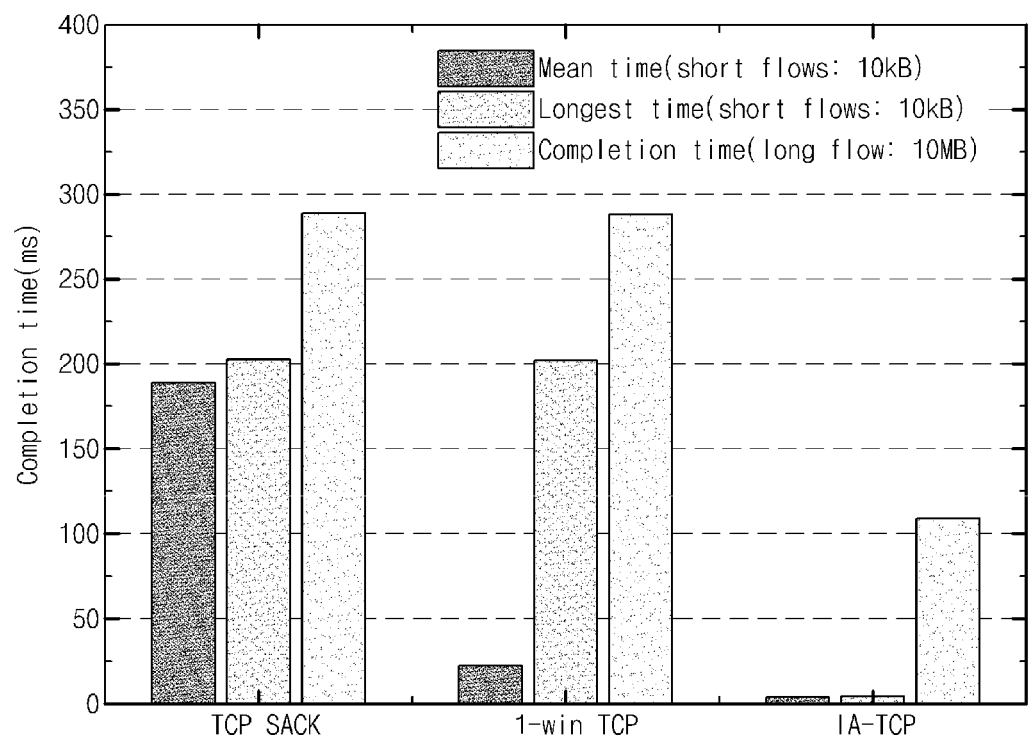
FIG. 7 illustrates a query completion time (ms) with 30 short and 1 long flows.

Since many Partition/Aggregate applications have soft realtime characteristic, it is important to measure the query completion time when short and long flows coexist. 30 short flows and 1 long flow are run, and their completion time is measured as shown in FIG. 7. The response data size is 10 kB for short flows and 10 MB for the long flow. In the case of TCP SACK, it is observed the mean query completion time of short flows is relatively high because most short flows experience packet loss and timeout, caused by the incast congestion. The 1-win TCP shows much lower mean completion time than TCP SACK, but the overall performance could be degraded as some flows affected by the long flow have longer completion time. IA-TCP shows very fast mean and longest completion time for short flows by avoiding the incast congestion. It is also observed that IA-TCP transfers the long message faster than the others by effectively utilizing the network pipe.

D. Fairness Among IA-TCP Flows

Figure 8:
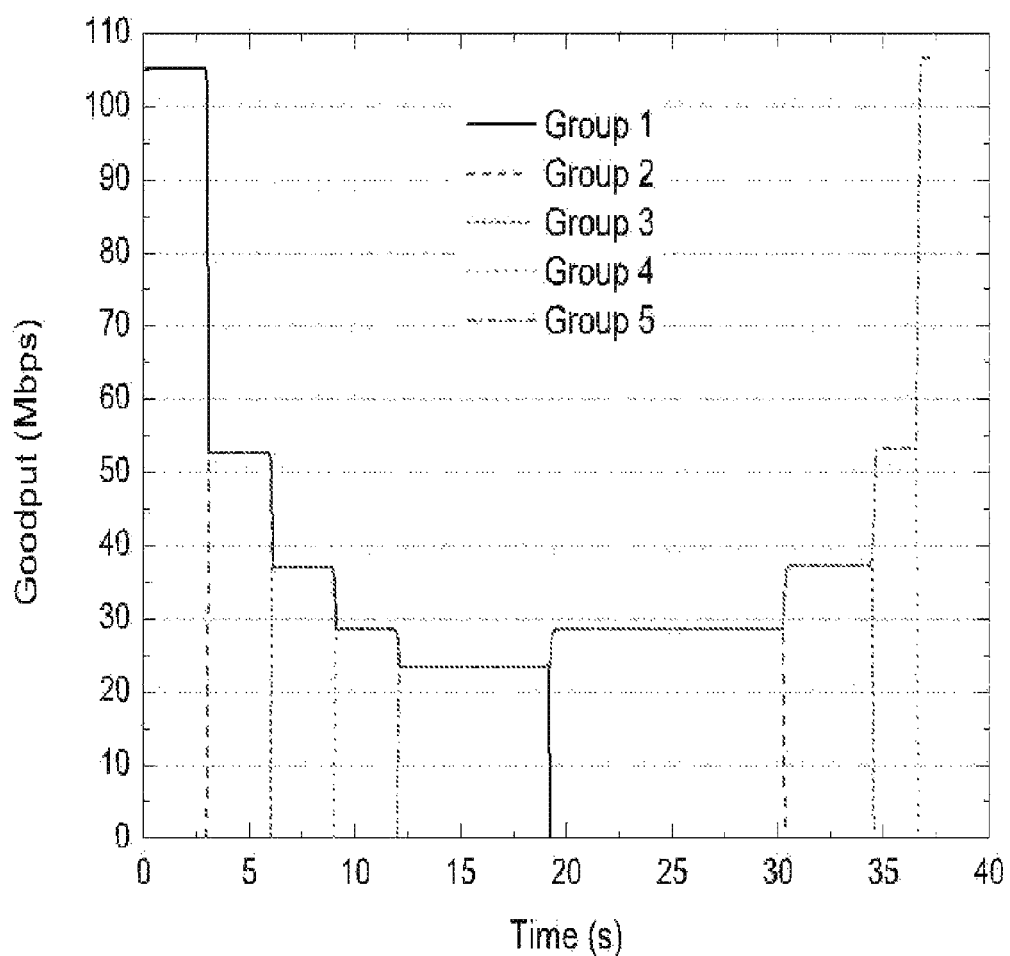
FIG. 8 illustrates a goodput fairness among IA-TCP flows.

Lastly, the goodput fairness between multiple IA-TCP flows that share the same bottleneck link is measured. The fairness to legacy protocols is not considered, because data center environment usually offers luxuries such as homogeneous network and single administrative control. To measure the fairness, 5 IA-TCP flow groups start sequentially with 3 seconds interval as shown in FIG. 8. Each group consists of 8 IA-TCP flows, and the response data size of each flow is 100 MB. From FIG. 8, it is observed that all flows in each group have the same bandwidth portion, and all groups fairly share the bandwidth as groups are added/ended.

While the present invention has been described with respect to the Incast-Avoidance TCP (IA-TCP) which is a rate-based congestion control algorithm, the present invention is not so limited. One skilled in the art may readily extend the teachings herein to other networks in which one node transfers it's connection to another node. In addition, the present invention may be preferred for use in wireless, radio, cellular or other non-wired applications, but the present invention is not so limited and may be employed in wired or optical networks supporting packet-based communication.

The present invention can be embodied in the form of methods, apparatus, devices, and systems. for practicing those methods. The present invention can also be embodied in the form of computer program code in tangible media, such as CD-ROMS, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. when implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

INDUSTRIAL APPLICABILITY

The present invention may be provided to online services and operate their own data centers to perfectly avoid the typical incast congestion problem in data center networks. The present invention is provided for the benefit of that the data center applications such as cloud services, web search, etc., will eventually show better performance, i.e. quality of service (QoS).

The invention claimed is:

1. A method for avoiding network congestion in a network, the network including an aggregator and a plurality of workers, the plurality of workers sharing a same bottleneck link to the aggregator, the method comprising:

counting a number of connections between the aggregator and the plurality of workers;

adjusting a window size of each of the plurality of workers;

adding an ACK delay to an ACK; and sending the ACK with the window size to the plurality of workers, wherein the ACK delay is based on the window size, the window size is based on the number of connections, and the ACK delay is $$\Delta = \left(\frac{n}{\text{Link capacity}/MSS} \times \text{advertise}\right) - RTT$$

where advertise is the window size, MSS is a maximum segment size, RTT is a minimum round trip time, and n is a total number of concurrent connections.

2. The method of claim 1, wherein the counting the number of connections between the aggregator and the plurality of workers comprises:

initializing the number of connections.

3. The method of claim 1, further comprising:

increasing the number of connections between the aggregator and the plurality of workers when a connection is created, and decreasing the number of connections when a connection is closed.

4. The method of claim 1, wherein the counting the number of connections further includes sending a query request to each of the plurality of workers.

5. The method of claim 1, wherein the window sizes of all connections are the same, the adjusting the window size further includes setting the window size to a maximal value, and the maximal value of the window size is $$\text{advertise} = \max\left(\left\lfloor \frac{\text{Link capacity}/MSS \times RTT}{n} \right\rfloor, 1\right).$$

6. The method of claim 1, wherein instead of a first one of the ACK delay ($\Delta$), a random value from 0 to (RTT+$\Delta$) that follows uniform distribution is chosen, where, RTT is a minimum round trip time.

7. The method of claim 1, wherein the sending the ACK with the window size to the plurality of workers is executed after a delay timer expires, if the ACK delay is larger than zero.

8. The method of claim 1, wherein the sending the ACK with the window size to the plurality of workers is immediately executed without a delay, if the ACK delay is negative.

9. The method of claim 1, wherein the method is executed in a Transmission Control Protocol (TCP) layer.

10. The method of claim 1, wherein the method is a rate-based congestion control algorithm.

11. An aggregator for avoiding network congestion in a network, the network including the aggregator and a plurality of workers, the plurality of workers sharing a same bottleneck link to the aggregator, the aggregator comprising:

a processor configured to, count a number of connections between the aggregator and the plurality of workers, adjust a window size of each of the plurality of workers, the window size being based on the number of connections, and add an ACK delay to an ACK, the ACK delay being based on the window size, the ACK delay being $$\Delta = \left(\frac{n}{\text{Link capacity}/MSS} \times \text{advertise}\right) - RTT$$

where advertise is the window size, MSS is a maximum segment size, MT is a minimum round trip time, and n is a total number of concurrent connections; and a transceiver configured to,
send the ACK with the window size to the plurality of workers.

12. The aggregator of claim 11, wherein the processor is further configured to
initialize the number of connections.

13. The aggregator of claim 11, wherein
the number of connections between the aggregator and the plurality of workers is increased when a connection is created, and
the number of connections is decreased when a connection is closed.

14. The aggregator of claim 11, wherein the transceiver is further configured send a query request to each of the plurality of workers.

15. The aggregator claim 11, wherein
the window sizes of all connections are the same,
the processor is further configured to set the window size to a maximal value, and
the maximal value of the window size is $$\text{advertise} = \max\left(\left\lfloor\frac{\text{Link capacity}/MSS \times RTT}{n}\right\rfloor, 1\right).$$

16. The aggregator of claim 11, wherein instead of a first one of the ACK delay ($\Delta$), a random value from 0 to (RTT+$\Delta$) that follows uniform distribution is chosen, where, RTT is a minimum round trip time.

17. The aggregator of claim 11, wherein the transceiver is further configured to
send the ACK with the window size to the plurality of workers, the ACK being executed after a delay timer expires, if the ACK delay is larger than zero.

18. The aggregator of claim 11, wherein the transceiver is further configured to
send the ACK with the window size to the plurality of workers, the ACK being immediately executed without a delay, if the ACK delay is negative.

19. A network system for avoiding network congestion, the network system comprising the aggregator according to claim 11 and a plurality of workers, the plurality of workers share the same bottleneck link to the aggregator.

20. A non-transitory computer readable storage medium storing computer readable instructions that, when executed by at least one processor, cause the at least one processor to perform a method of claim 1.

\* \* \* \* \*